(12) United States Patent
Prenner

(10) Patent No.: US 12,291,428 B2
(45) Date of Patent: May 6, 2025

(54) CONTROL DEVICE FOR A PASSENGER TRANSPORT SYSTEM

(71) Applicant: INVENTIO AG, Hergiswil (CH)

(72) Inventor: Alexander Prenner, Pöttsching (AT)

(73) Assignee: Inventio AG, Hergiswil (CH)

( * ) Notice: Subject to any disclaimer, the term of this patent is extended or adjusted under 35 U.S.C. 154(b) by 196 days.

(21) Appl. No.: 18/252,170

(22) PCT Filed: Nov. 3, 2021

(86) PCT No.: PCT/EP2021/080470
§ 371 (c)(1),
(2) Date: May 8, 2023

(87) PCT Pub. No.: WO2022/101066
PCT Pub. Date: May 19, 2022

(65) Prior Publication Data
US 2023/0406675 A1 Dec. 21, 2023

(30) Foreign Application Priority Data
Nov. 16, 2020 (EP) .................................... 20207875

(51) Int. Cl.
*B66B 25/00* (2006.01)
*H02P 27/06* (2006.01)

(52) U.S. Cl.
CPC .............. *B66B 25/00* (2013.01); *H02P 27/06* (2013.01)

(58) Field of Classification Search
CPC ........... B66B 25/00; H02P 27/06; H02P 23/14
See application file for complete search history.

(56) References Cited

U.S. PATENT DOCUMENTS

2002/0189905 A1* 12/2002 Spannhake ............. B66B 25/00
187/277
2010/0327795 A1* 12/2010 Jahkonen ................ B66B 25/00
318/504

FOREIGN PATENT DOCUMENTS

DE          10128839 B4    11/2006
WO       WO 98/18711 A1    5/1998
WO      WO 02057174 A1    7/2002

OTHER PUBLICATIONS

International Search Report for International Application No. PCT/EP2021/080470 dated Feb. 2, 2022.

* cited by examiner

*Primary Examiner* — Cortez M Cook
(74) *Attorney, Agent, or Firm* — Knobbe, Martens, Olson & Bear, LLP

(57) ABSTRACT

An electrical control device for controlling the drive of a passenger transport system which can be switched between load operation and idle operation is described. The electrical control device includes at least a three-phase mains voltage connection, a frequency converter, and a controllable switching device. The switching device can couple the three phases of the drive motor to the three phases of the mains voltage connection in a load operation switching state and to the three phases of the frequency converter in an idle operation switching state. In this manner, the drive motor is supplied with the three-phase mains voltage in the load operation switching state and with the three-phase output voltage of the frequency converter in the idle operation switching state.

16 Claims, 3 Drawing Sheets

CONTROL DEVICE FOR A PASSENGER TRANSPORT SYSTEM

TECHNICAL FIELD

The disclosure relates to a control device for a passenger transport system designed as an escalator or moving walkway and to a method for controlling the drive of the passenger transport system, in particular, including a mains voltage connection which supplies a three-phase mains voltage, an electric drive motor, and a frequency converter.

SUMMARY

A typical passenger transport system for conveying passengers in the form of an escalator or a moving walkway comprises a plurality of closely spaced step plates which are connected to one another to form an endless conveyor belt and are moved in the desired conveying direction by means of the drive motor.

In order to reduce the energy consumption and the wear and tear of such passenger transport systems, it has become customary to set such passenger transport systems in conveying motion only when there is a need for transport and to bring them to a standstill otherwise. Alternatively, or in addition, the passenger transport system can also be set to what is known as a crawl if there is no need for transport. Here, the speed of the conveyor belt is massively reduced, so that, on the one hand, energy can be saved, and on the other hand, approaching users are shown the operational readiness and the intended conveying direction of the passenger transport system.

In order to detect a transport requirement, a transport requirement signal transmitter can be provided, for example, in the form of a step mat, a light barrier, a radar sensor and the like arranged upstream of the passenger transport system in the direction of transport. If there is a transport requirement, for example, because a passenger has been detected by the radar sensor, the passenger transport system is set in conveying motion for a predetermined period of time and switched off again if no further need for transport has been determined within a predetermined period of time.

It is known from WO 98/18711 A1 not to switch the drive motor on and off abruptly to avoid peak loads during frequent switching on and off of the passenger transport system, but rather to let the speed of the drive motor increase or decrease in a ramp-like manner during switching operations. Induction motors are predominantly used for such passenger transport systems. Since the speed of an induction motor depends on the frequency of the alternating voltage feeding it, which means constant speed of the induction motor when it is fed directly from an alternating voltage network with a constant mains frequency, a controllable frequency converter is used by means of which the mains frequency fed thereto can be converted into an output frequency different from the mains frequency.

The costs for a frequency converter that supplies the drive motor of an escalator or a moving walkway even in load operation are high, since the costs of the frequency converter increase enormously with the output power that the frequency converter must be able to deliver.

In order to keep the acquisition and operating costs lower, in WO 98/18711 A1, the passenger transport system is driven at full conveying speed only in load operation. In stand-by operation or idle operation, when there is no transport requirement, the passenger transport system should be operated only at a reduced idle operation speed. In this case, the drive motor is supplied from the frequency converter only during idle operation and the switching processes, but directly from the mains voltage source during load operation. This creates the possibility of designing the frequency converter somewhat lower in terms of its maximum output, which leads to considerable cost savings compared to a frequency converter of which the maximum output is adapted to the load operation of the passenger transport system. The passenger transport system known from WO 98/18711 A1 then goes into idle operation when no further transport requirement is reported after a transport request has been carried out and is switched to a standstill only if no renewed transport requirement is reported for a predetermined period of time after the transfer to idle operation. However, such an electrical control device is still quite expensive and also has a very poor degree of efficiency in idle operation, so that a lot of electrical energy is wasted in this case without any benefit.

In contrast, it is the object of the disclosure in particular to propose an electrical control device which is even more cost-effective and in particular operates in a more energy efficient manner in idle operation.

This object is achieved by an electrical control device which is used to control the drive of a passenger transport system which can be switched between load operation and idle operation. The passenger transport system is designed as an escalator or moving walkway and has a three-phase drive motor. The electrical control device comprises at least:
- a three-phase mains voltage connection, which is used to supply a three-phase mains voltage;
- a frequency converter which can be controlled at least with regard to the frequency of its three-phase output voltage;
- a controllable switching device which can be switched between a load operation switching state and an idling operation switching state, the three phases of the drive motor being coupled to the three phases of the mains voltage connection in the load operation switching state, and the three phases of the drive motor being coupled to the three phases of the frequency converter in the idle operation switching state, so that the drive motor is supplied with a three-phase mains voltage in load operation and with the three-phase output voltage of the frequency converter in idle operation.

According to the disclosure, the frequency converter is supplied via at least one phase of the three-phase mains voltage connection and a neutral conductor of the mains voltage connection. This design is a departure from the common doctrine that the frequency converter must have the same maximum three-phase output voltage as the three-phase mains voltage connection. Investigations have shown that, in the idle operation switching state, the output power or output voltage of the frequency converter is sufficient to bring the still-unoccupied conveyor belt to a desired nominal speed in a sufficiently short time. When this is achieved, the switching device can be used to switch from the idle operation switching state to the load operation switching state, in order to supply the drive motor with sufficient energy to transport users without a loss of speed. Switching is still possible even if a small number of users have already reached and stepped onto the conveyor belt, since the inertia of the moving conveyor belt and the kinematic transmission chain between the drive motor and the conveyor belt is so great that it is not noticeable if conveyor belt is braked during the switching process. The significant advantage of this departure is, on the one hand, that the components of the frequency converter can be dimensioned much smaller due to the lower supply voltage between one phase and the neutral conductor than with a supply voltage that is present between the three phases of the mains voltage connection. As a result, the production costs of the control device can be kept significantly lower. As a further advantage, it was found that the smaller dimensioning of the frequency converter means that its components are better utilized and, as a result, its efficiency is significantly higher compared to the conventional design with a phase voltage/phase supply voltage. As a result, considerable electrical energy can be saved with frequent operation in the idle operation switching state.

In other words, a frequency converter supply voltage is applied to supply the frequency converter, which supply voltage is smaller than the three-phase mains voltage by a factor of 1/≈3 or a factor of 1/1.73.

With a three-phase mains voltage of three times 400 volts, the frequency converter supply voltage is thus 230 volts due to the phase/neutral conductor connection and correspondingly the three-phase output voltage of the frequency converter can be varied in a range of three times 0 to 230 volts. With a three-phase mains voltage of three times 380 volts, the frequency converter supply voltage is 220 volts and correspondingly the three-phase output voltage of the frequency converter can be varied in a range of three times 0 to 220 volts.

In an embodiment of the disclosure, the frequency converter can have a rectifier module having a diode bridge circuit which is connected, on its input side, to a phase of the three-phase mains voltage connection and to the neutral conductor. If necessary, the DC voltage generated by the rectifier bridge can be smoothed by means of a capacitor in the DC voltage circuit of the frequency converter.

In a further embodiment of the disclosure, the frequency converter can have a rectifier module with a diode arrangement that differs from the bridge circuit. This rectifier module is connected on its input side to each phase of the three-phase mains voltage connection, the three phases being brought together via a diode in the same reverse direction and forming the positive pole of the DC voltage circuit of the frequency converter. In this case, the neutral conductor forms the negative pole of the DC voltage circuit.

In a further embodiment of the disclosure, the frequency converter can have a rectifier module with a diode arrangement that blocks the passage of current in the opposite direction with respect to the embodiment described above. This rectifier module is also connected on its input side to each phase of the three-phase mains voltage connection, the three phases being brought together via a diode in the same reverse direction and forming the negative pole of the DC voltage circuit of the frequency converter. In this case, the neutral conductor forms the positive pole of the DC voltage circuit.

In a further embodiment of the electrical control device, the controllable switching device can be controlled by a controller of the passenger transport system. In other words, the control of the passenger transport system takes over the entire switching logic. For this purpose, it preferably uses status information that is reported back to the controller from the frequency converter and optionally also from the controllable switching device. Such status information can be, for example, the current three-phase output voltage of the frequency converter and/or the current switching state of the controllable switching device. Of course, the switching process of the controllable switching device from the idle operation switching state to the load operation switching state can also take place on a time basis, by the controller triggering the switching process in the controllable switching device with a time delay after the frequency converter has been controlled. As an alternative to this, the controllable switching device can also be activated directly by a control module of the frequency converter.

In a further embodiment, the electrical control device can have a phase synchronization module. This phase synchronization module synchronizes the converter frequency of the three-phase output voltage of the frequency converter with the mains frequency of the three-phase mains voltage connection, by, for example, the zero crossings of the mains frequency being detected and the IGBT of the frequency converter being controlled accordingly, so that the zero crossings of the three phases and the phase position thereof match the corresponding phases of the mains voltage connection. The phase synchronization module then triggers the switching process of the controllable switching device depending on the synchronized mains frequency and converter frequency. Of course, the entire logic of the phase synchronization module can also be implemented in the controller of the passenger transport system.

A passenger transport system which is designed as an escalator or moving walkway and has at least a controller, a three-phase drive motor, and an electrical control device of the above-mentioned type requires signal-transmitting connections between the elements described above. The controller can thus be connected to the electrical control device or to its controllable frequency converter and its controllable switching device via a wired or wireless signal connection.

In order to be able to detect a transport requirement, the passenger transport system can have at least one transport requirement signal transmitter. In other words, the passenger transport system has sensors that can detect an approach or entry of a user. A detected user is interpreted as a transport requirement and transmitted to the controller as a sensor signal. The controller then controls at least the controllable frequency converter depending on the sensor signal and, depending on the design of the electrical control device, directly or indirectly controls the controllable switching device.

Specifically, this can mean that the controller controls the controllable switching device in such a way that the three-phase drive motor of the drive is supplied with the three-phase mains voltage of three times 400 volts during load operation and is supplied with the three-phase output voltage of the frequency converter of three times 0 to 230 volts during idle operation. With a three-phase mains voltage of 380 volts, the three-phase drive motor of the drive is correspondingly supplied with the three-phase mains voltage of three times 380 volts during load operation and is supplied with the three-phase output voltage of the frequency converter of three times 0 to 220 volts during idle operation.

As already mentioned above, the passenger transport system can have at least one transport requirement signal transmitter, by means of which a transport requirement and thus an imminent load operation can be detected. The transport requirement signal transmitter transmits a detected transport requirement to the controller as a sensor signal, the controller, depending on this sensor signal, controlling the controllable frequency converter and the controllable switching device.

BRIEF DESCRIPTION OF THE DRAWINGS

Further advantages, features and details of the disclosure can be found in the following description of embodiments and with reference to the drawings, in which like or functionally like elements are provided with identical reference signs. The drawings are merely schematic and are not to scale. In the drawings.

DETAILED DESCRIPTION

Figure 1:
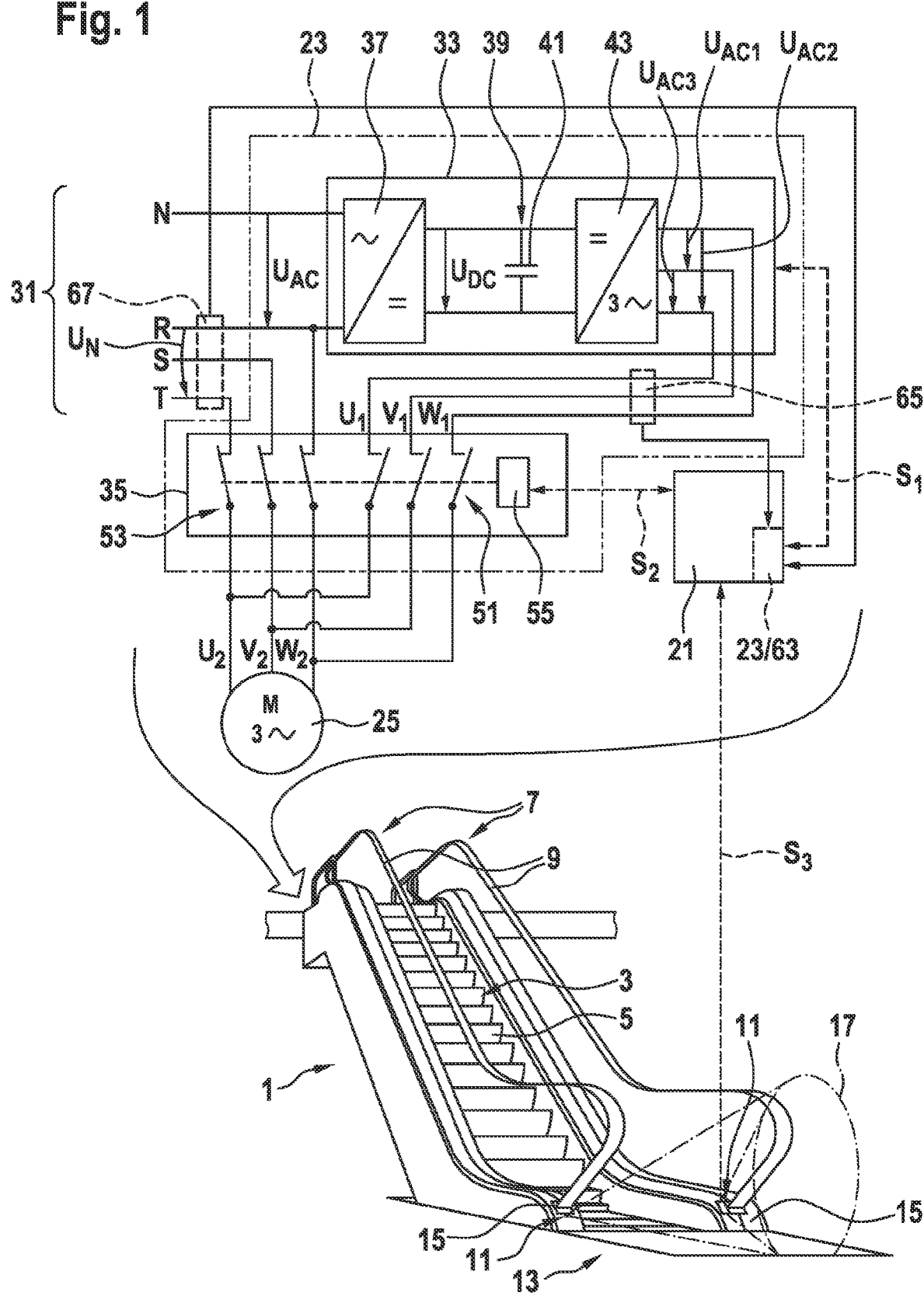
FIG. 1 shows a passenger transport system which is designed as an escalator or moving walkway, and has at least a controller, a three-phase drive motor, and an electrical control device.

FIG. 1 shows a passenger transport system 1, which is designed as an escalator. The components of the passenger transport system 1 that are visible to a user are a continuously movable conveyor belt 3 having steps 5. Balustrades 7 with continuously movable handrails 9 extend on the left and right sides of the conveyor belt 3. The return of the handrails 9 and the conveyor belt 3 takes place within the passenger transport system 1 and is therefore hidden from the users. The transport requirement signal transmitters 11 that monitor the access region 13 of the passenger transport system 1 are also hidden. In the present embodiment, the transport requirement signal transmitters 11 are radar sensors which are arranged behind handrail inlet caps 15 so as to be hidden. The detection region 17 thereof is indicated by a dash-dotted line.

As indicated by the broad arrow, a controller 21, a three-phase drive motor 25 and an electrical control device 23 are also accommodated within the passenger transport system 1. The three-phase drive motor 25 acts on the conveyor belt 3 and the handrails 9 via a transmission (not shown) and can drive same. The controller 21 controls and regulates the driving operation of the passenger transport system 1, as shown by way of example in FIG. 2 described below.

As shown in FIG. 1, the electrical control device 23 comprises at least a three-phase mains voltage connection 31, a frequency converter 33, and a controllable switchover device 35.

Figure 3A:
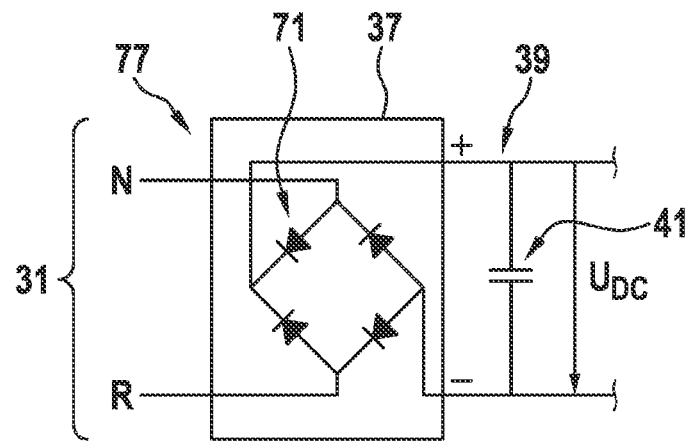
FIG. 3A shows a rectifier module of the frequency converter in a first embodiment.

The three-phase mains voltage connection 31 is used to supply a three-phase mains voltage $U_N$ via the three phases R, S, T and also has a neutral conductor N. In the present embodiment, the neutral conductor N and the phase R of the mains voltage connection 31 are connected to a rectifier module 37 of the frequency converter 33 and supply a supply voltage $U_{AC}$. Various embodiments, including those in which all three phases R, S, T and the neutral conductor N of the mains voltage connection are connected to the rectifier module 37, are described below with reference to FIG. 3A to 3C.

The frequency converter 33 also has a DC voltage circuit 39, which is supplied by the rectifier module 37. Depending on the configuration of the rectifier module 37, it can be useful if the direct voltage $U_{DC}$ in the DC voltage circuit 39 is smoothed by means of a capacitor 41. The DC voltage circuit 39 in turn supplies a converter module 43 of the frequency converter 33. The converter module 43 can be controlled with regard to its three-phase output voltage $U_{AC1}$, $U_{AC2}$, $U_{AC3}$ For this purpose, the frequency converter 33 can be activated by the controller 21, as is indicated by the double arrow $S_1$ shown with a broken line. The output voltages $U_{AC1}$, $U_{AC2}$, $U_{AC3}$ are output by the converter module 43 via three phases $U_1$, $V_1$, $W_1$.

The three phases $U_1$, $V_1$, $W_1$ are connected to a first switch arrangement 51 of the controllable switching device 35. The three phases R, S, T of the mains voltage connection 31 are also connected to a second switch arrangement 53 of the controllable switching device 35. Both switch arrangements 51, 53 are switched by an actuator 55 of the controllable switching device 35, the actuator 55 also being activated by the controller 21 as indicated by the double arrow $S_2$ shown with a broken line. Double arrows $S_1$, $S_2$ are used here because a bidirectional signal flow is provided. On the one hand, control commands are transmitted from the controller 21 to the frequency converter 33 or to the controllable switching device 35 and, on the other hand, the current states thereof are sent back to the controller 21.

The controllable switching device 35 has the task of switching between a load operation switching state B2 and an idle operation switching state B1 (see FIG. 2), the three phases $U_2$, $V_2$, $W_2$ of the drive motor 25 being coupled to the three phases R, S, T of the mains voltage connection 31 in the load operation B2, while the three phases $U_1$, $V_1$, $W_1$ of the converter module 43 are decoupled from the three phases $U_2$, $V_2$, $W_2$ of the drive motor 25. In the idle operation switching state B1, if the couplings are exactly the opposite, then the three phases $U_2$, $V_2$, $W_2$ of the drive motor 25 are coupled to the three phases $U_1$, $V_1$, $W_1$ of the converter module 43 and the three phases R, S, T of the mains voltage connection 31 are decoupled from the three phases $U_2$, $V_2$, $W_2$ of the drive motor 25. In other words, the drive motor 25 is supplied with a three-phase mains voltage U N in load operation and with the three-phase output voltage $U_{AC1}$, $U_{AC2}$, $U_{AC3}$ of the frequency converter 33 in idle operation.

As already described, the passenger transport system 1 has transport requirement signal transmitters 11 in the access regions 13. A user can be detected by these signal transmitters when he steps toward the access region 13 of the passenger transport system 1 in order to enter same. The transport requirement signal transmitter 11 thus detects a transport requirement and thus an imminent load operation. A detected transport requirement is transmitted to the controller 21 as a sensor signal $S_3$, the controller 21, depending on this sensor signal $S_3$, controlling the controllable frequency converter 33 and the controllable switching device 35.

Figure 2:
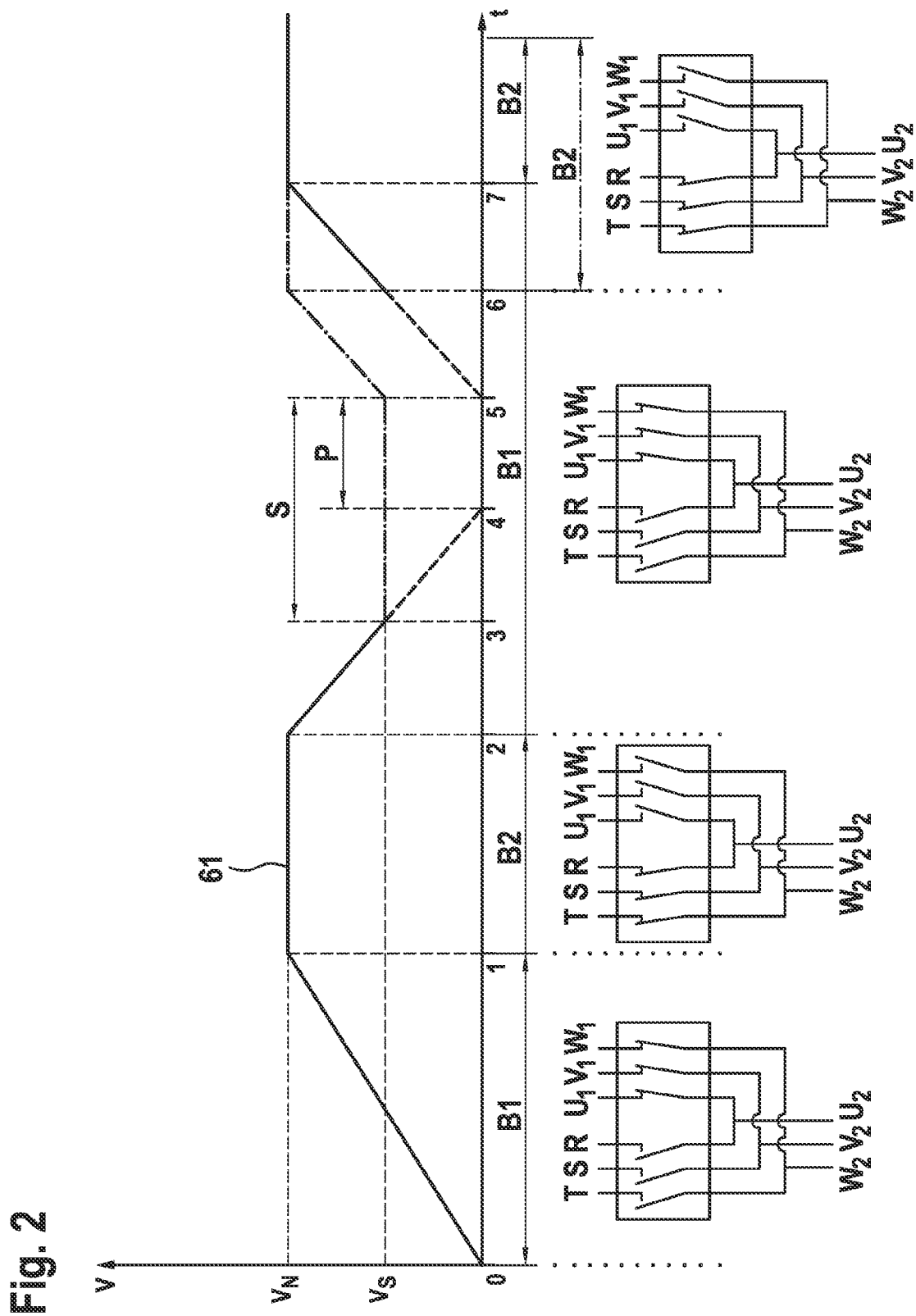
FIG. 2 is a diagram showing the various possible operating states.

In order to show the interaction of the mains voltage connection 31, the frequency converter 33 and the controllable switching device 35, an exemplary speed curve 61 is shown in FIG. 2 during various possible operating states. The speed V of the conveyor belt 3 is plotted on the ordinate and the time t is plotted on the abscissa. The various operating states are described below with reference to FIGS. 1 and 2.

At the time 0, for example, an approaching user is detected by the transport requirement signal transmitter 11 and reported to the controller 21 as a transport requirement. This upregulates the three-phase output voltage $U_{AC1}$, $U_{AC2}$, $U_{AC3}$ of the frequency converter 33, the controllable switching device 35 being switched to the idle operation switching state B1. In other words, the three-phase output voltage $U_{AC1}$, $U_{AC2}$, $U_{AC3}$ of the frequency converter 33 is supplied to the drive motor, while the drive motor 25 is separated from the three-phase mains voltage connection 31. Between the times 0 and 1, the frequency converter 33 is upregulated so that the speed curve 61 of the conveyor belt 3 and the handrails 9 increases in a ramp-like manner up to the nominal speed $V_N$.

At the time 1, at which the user has approximately reached the conveyor belt 3, it is at the nominal speed $V_N$. The controller 21 can now send a switching signal S 2 to the controllable switching device 35. With the switching, the three-phase drive motor 25 is decoupled from the frequency converter 33 and connected to the three phases R, S, T of the mains voltage connection 31. The controllable switching device 35 has thus changed from the idle operation switching state B1 to the load operation switching state B2 in order to supply the three-phase drive motor 25 with sufficient electrical energy to transport users without a loss of speed.

At the time 2, the user has left the passenger transport device 1. This time can be calculated from the travel time t and the nominal speed $V_N$, for example. Alternatively, the signal from the transport requirement signal transmitter 11 arranged at the other access region 13 can of course also be used, which can register the departure of the user and report it to the controller 21. From the time 2, the speed V of the conveyor belt 3 and the handrails 9 can be reduced again if no new user approaches. To reduce the speed V, the controllable switching device 35 is switched from the load operation switching state B2 back to the idle operation switching state B1 at time 2, the output voltages $U_{AC1}$, $U_{AC2}$, $U_{AC3}$ of the frequency converter 33 first being upregulated before the switching process and then downregulated in the manner of a ramp after the switching process.

With regard to further operation, there may be two options:

In a first variant, the conveyor belt 3 can be brought to a standstill P in the idle operation switching state B1, which standstill, in the present example, is reached at point 4 and remains in place until point 5. As soon as the transport requirement signal transmitter 11 again reports a transport requirement (here at time 5), the drive motor 25 is started up by means of the frequency converter 33 in a manner analogous to that already described for times 0 to 1 and when the nominal speed V N is reached at time 7, the switching process by the controllable switching device 35 from the idle operation switching state B1 to the load operation switching state B2 takes place.

In a second variant, the conveyor belt 3 can be put into what is known as a crawl S in the idle operation switching state B1, the crawl speed Vs corresponding, for example, to half of the nominal speed $V_N$. The crawl speed V s is then kept constant, as shown by the dash-dotted line, until a transport requirement is registered again at the time 5. The drive motor is then started up again by means of the frequency converter 33 until, after the nominal speed V N is reached at time 6, the switching process by the controllable switching device from the idle operation switching state B1 to the load operation switching state B2 takes place. As can be clearly seen from the diagram, the conveyor belt 11 in the second variant reaches the nominal speed V N much earlier and the switching process can take place earlier.

If the phase zero crossings of the mains voltage connection 31 are shifted in relation to the phase zero crossings of the output voltages $U_{AC1}$, $U_{AC2}$, $U_{AC3}$ of the frequency converter 33 during the switching process, this can lead to undesirable additional loads for the mechanical and electrical components of the passenger transport system 1. In order to avoid this, the electrical control device 23 can have a phase synchronization module 63. This phase synchronization module 63 synchronizes the converter frequency of the three-phase output voltage $U_{AC1}$, $U_{AC2}$, $U_{AC3}$ of the frequency converter 33 with the mains frequency of the three-phase mains voltage connection 31, by, for example, the phase zero crossings being detected by sensors 65, 67 and the IGBT (not shown) of the converter module 43 being controlled accordingly, so that the zero crossings of the three phases $U_1$, $V_1$, $W_1$ and the phase position thereof match the corresponding phases R, S, T of the mains voltage connection 31. The phase synchronization module 63 then triggers the switching process of the controllable switching device 35 depending on the synchronized mains frequency and converter frequency. As shown, the entire logic of the phase synchronization module 63 can be implemented in the controller 21 of the passenger transport system 1. Of course, the phase synchronization module 63 can also be implemented separately from the controller 21.

As already described above and shown in FIG. 1, the rectifier module 37 of the frequency converter 33 is supplied by at least one phase R and the neutral conductor N of the mains voltage connection 31. In other words, a frequency converter supply voltage $U_{AC}$ is applied to supply the frequency converter 66, which supply voltage is smaller than the three-phase mains voltage $U_N$ by a factor of 1/≈3 or a factor of 1/1.73.

With a three-phase mains voltage U N of, for example, three times 400 volts, the frequency converter supply voltage $U_{AC}$ is therefore 230 volts. After the rectification, a direct voltage $U_{DC}$ is present in the direct voltage circuit 39, which direct voltage varies depending on the load. The three-phase output voltage $U_{AC1}$, $U_{AC2}$, $U_{AC3}$ of the converter module 43 supplied by the direct voltage circuit 39 can be varied in a range of three times to 230 volts due to the existing DC voltage $U_{DC}$, provided that this DC voltage is approximately sinusoidal. With a three-phase mains voltage U N of three times 380 volts, the frequency converter supply voltage is 220 volts and correspondingly the three-phase output voltage $U_{AC1}$, $U_{AC2}$, $U_{AC3}$ of the frequency converter 33 can be varied in each case in a range of three times 0 to 220 volts.

The frequency converter 33 can have differently configured rectifier modules 37. The rectifier module 37 shown in FIG. 3A has a diode bridge circuit 71. This bridge circuit is connected on its input side 77 to a phase R and to the neutral conductor N of the three-phase mains voltage connection 31. The direct voltage $U_{DC}$ generated by the bridge circuit 71 is output to the downstream DC voltage circuit 39 of the frequency converter 33 and smoothed there by means of a capacitor 41.

Figure 3B:
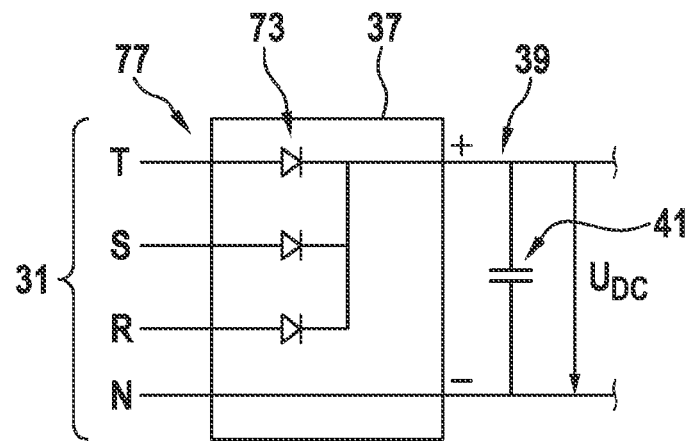
FIG. 3B shows a rectifier module of the frequency converter in a second embodiment.

The rectifier module 37 shown in FIG. 3B has a diode arrangement 73 deviating from the bridge circuit 71 and is connected, on its input side 77, to each phase R, S, T of the three-phase mains voltage connection 31. The three phases R, S, T are each brought together via a diode with the same reverse direction in such a way that only the positive half-waves are allowed to pass due to the reverse direction and the positive pole of the DC voltage circuit 39 of the frequency converter 33 is thus formed. In this case, the neutral conductor N forms the negative pole of the DC voltage circuit 39.

Figure 3C:
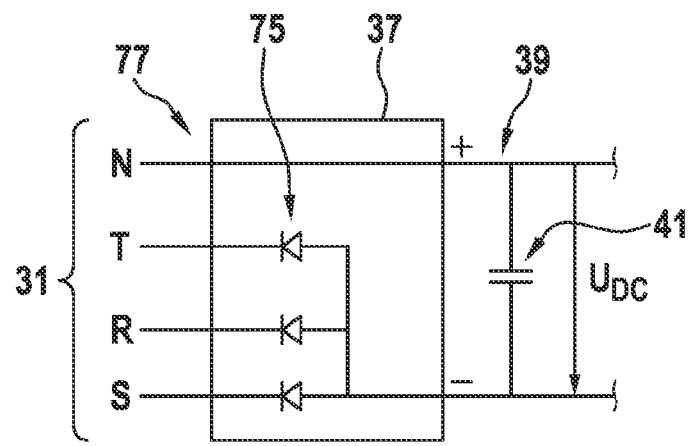
FIG. 3C shows a rectifier module of the frequency converter in a third embodiment.

The rectifier module 37 shown in FIG. 3C has a diode arrangement 75 which is almost identical to the previously described diode arrangement of FIG. 3B and is also connected to the neutral conductor N and the three phases R, S, T of the three-phase mains voltage connection 31. The three phases R, S, T are each brought together via a diode with the same reverse direction in such a way that only the negative half-waves are allowed to pass due to the reverse direction and the negative pole of the DC voltage circuit 39 of the frequency converter 33 is thus formed. In this case, the neutral conductor N forms the positive pole of the DC voltage circuit 39.

Although FIG. 1 shows a passenger transport system 1 designed as an escalator, it is obvious that the present invention can also be used in a passenger transport system 1 designed as a moving walkway.

Finally, it should be noted that terms such as "comprising," "having," etc., do not preclude other elements or steps and terms such as "a" or "an" do not preclude a plurality. Furthermore, it should be noted that features or steps that have been described with reference to one of the above embodiments may also be used in combination with other features or steps of other embodiments described above. Reference signs in the claims should not be considered to be limiting.

The invention claimed is:

1. An electrical control device for controlling a drive of a passenger transport system that can be switched between load operation and idle operation, wherein the passenger transport system comprises an escalator or moving walkway and includes a three-phase drive motor, the electrical control device comprising:
a three-phase mains voltage connection for supplying a three-phase mains voltage;
a frequency converter that can be controlled at least with regard to a frequency of a three-phase output voltage;
a controllable switching device having:
a load operation switching state in which three phases of the three-phase drive motor can be coupled to three phases of the three-phase mains voltage connection, and
an idle operation switching state in which the three phases of the three-phase drive motor can be coupled to the three phases of the frequency converter,
wherein the three-phase drive motor is supplied with the three-phase mains voltage in the load operation switching state and with the three-phase output voltage of the frequency converter in the idle operation switching state,
wherein the frequency converter is supplied via at least one phase the three-phase mains voltage connection and a neutral conductor of the three-phase mains voltage connection.

2. The electrical control device of claim 1, wherein a frequency converter supply voltage is applied to supply the frequency converter, which frequency converter supply voltage is smaller than the three-phase mains voltage by a factor of $1/\sqrt{3}$.

3. The electrical control device of claim 2, wherein the three-phase mains voltage is three times 400 volts and the three-phase output voltage of the frequency converter has a range from three times 0 to 230 volts.

4. The electrical control device of claim 2, wherein the three-phase mains voltage is three times 380 volts and the three-phase output voltage of the frequency converter has a range from three times 0 to 220 volts.

5. The electrical control device of claim 1, wherein the frequency converter comprises a rectifier module having a diode bridge circuit connected, on its input side, to a phase of the three-phase mains voltage connection and to the neutral conductor.

6. The electrical control device of claim 1, wherein the frequency converter comprises a rectifier module having a diode arrangement, which rectifier module is connected, on its input side, to each phase of the three-phase mains voltage connection, wherein the three phases are combined via a diode in a same reverse direction and form a positive pole of a DC voltage circuit of the frequency converter and the neutral conductor forms a negative pole of the DC voltage circuit.

7. The electrical control device of claim 1, wherein the frequency converter comprises a rectifier module having a diode arrangement, which rectifier module is connected, on its input side, to each phase of the three-phase mains voltage connection, wherein the three phases are combined via a diode in a same reverse direction and form a negative pole of a DC voltage circuit of the frequency converter and the neutral conductor forms a positive pole of the DC voltage circuit.

8. The electrical control device of claim 1, wherein the controllable switching device can be controlled by a controller of the passenger transport system.

9. The electrical control device of claim 1, further comprising a phase synchronization module that synchronizes a converter frequency of the three-phase output voltage of the frequency converter with a mains frequency of the three-phase mains voltage connection and triggers a switching process of the controllable switching device depending on the mains frequency and converter frequency.

10. A passenger transport system configured as an escalator or moving walkway, the passenger transport system comprising:
a controller;
a three-phase drive motor; and
the electrical control device of claim 1, wherein the controller is connected via a wired or wireless signal connection to the electrical control device.

11. The passenger transport system of claim 10, wherein the controller is connected via the wired or wireless signal connection to the frequency converter or the controllable switching device.

12. The passenger transport system of claim 10, further comprising at least one transport requirement signal transmitter that detects and transmits a transport requirement to the controller as a sensor signal such that, depending on the sensor signal, the controller controls the frequency converter and the controllable switching device.

13. A method for controlling the drive of the passenger transport system of claim 10, wherein the controller controls the controllable switching device such that the three-phase drive motor of the drive is supplied with:
the three-phase mains voltage of three times 400 volts during load operation, and
the three-phase output voltage of the frequency converter of three times 0 to 230 volts during idle operation.

14. The method of claim 13, wherein the passenger transport system further comprises at least one transport requirement signal transmitter that detects and transmits a transport requirement to the controller as a sensor signal, wherein, depending on the sensor signal, the controller controls the frequency converter and the controllable switching device.

15. A method for controlling the drive of the passenger transport system of claim 10, wherein the controller controls the controllable switching device such that the three-phase drive motor of the drive is supplied with:
the three-phase mains voltage of three times 380 volts during load operation, and
the three-phase output voltage of the frequency converter of three times 0 to 220 volts during idle operation.

16. The method of claim 15, wherein the passenger transport system further comprises at least one transport requirement signal transmitter that detects and transmits a transport requirement to the controller as a sensor signal, wherein, depending on the sensor signal, the controller controls the frequency converter and the controllable switching device.

\* \* \* \* \*